(12) United States Patent
Nakagami (10) Patent No.: US 8,919,486 B2
(45) Date of Patent: Dec. 30, 2014

(54) HYDRAULIC EXCAVATOR

(71) Applicant: Komatsu Ltd., Tokyo (JP)

(72) Inventor: Tatsuya Nakagami, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/236,658

(22) PCT Filed: Feb. 15, 2013

(86) PCT No.: PCT/JP2013/053719
§ 371 (c)(1),
(2), (4) Date: Feb. 3, 2014

(87) PCT Pub. No.: WO2014/125622
PCT Pub. Date: Aug. 21, 2014

(65) Prior Publication Data
US 2014/0299401 A1    Oct. 9, 2014

(51) Int. Cl.
*B60K 13/04* (2006.01)
*E02F 9/08* (2006.01)

(52) U.S. Cl.
CPC ............. *E02F 9/0866* (2013.01); *E02F 9/0891* (2013.01)
USPC ....................................................... 180/309

(58) Field of Classification Search
USPC ................... 180/68.1, 309; 60/299; 422/169; 196/192
See application file for complete search history.

(56) References Cited

U.S. PATENT DOCUMENTS

| | | | |
|---|---|---|---|
| 5,203,166 A * | 4/1993 | Miller | 60/274 |
| 7,357,221 B2 * | 4/2008 | Maier | 181/268 |
| 8,167,067 B2 * | 5/2012 | Peterson et al. | 180/68.2 |
| 8,201,398 B2 * | 6/2012 | Boeckenhoff | 60/301 |
| 8,230,678 B2 * | 7/2012 | Aneja et al. | 60/295 |
| 8,256,551 B2 * | 9/2012 | Entriken et al. | 180/68.1 |
| 8,418,448 B2 * | 4/2013 | Kamata et al. | 60/322 |
| 8,505,661 B2 * | 8/2013 | Tsuji et al. | 180/68.4 |
| 8,720,638 B1 * | 5/2014 | Nakagami et al. | 180/309 |
| 8,739,918 B2 * | 6/2014 | Mariner et al. | 180/309 |
| 2014/0020972 A1 * | 1/2014 | Masumoto et al. | 180/309 |

FOREIGN PATENT DOCUMENTS

| | | |
|---|---|---|
| JP | 2005-16321 A | 1/2005 |
| JP | 2009-103016 A | 5/2009 |
| JP | 2012-219624 A | 11/2012 |
| WO | 2011/152306 A1 | 12/2011 |

OTHER PUBLICATIONS

The International Search Report for the corresponding international application No. PCT/JP2013/053719, issued on May 28, 2013.

* cited by examiner

*Primary Examiner* — John Walters
*Assistant Examiner* — James Triggs
(74) *Attorney, Agent, or Firm* — Global IP Counselors, LLP (57) ABSTRACT

A hydraulic excavator includes an engine, an engine room accommodating the engine, a fan configured to generate cooling wind in the engine room, an exhaust treatment apparatus and an engine hood. The exhaust treatment apparatus treats exhaust from the engine. The exhaust treatment apparatus is at least partially positioned above the engine. The engine hood is arranged above the engine room. An upper surface of the engine hood has a first planar section arranged above the engine, a second planar section including ventilation holes, and an inclined section arranged between the first planar section and the second planar section. The second planar section is arranged above the exhaust treatment apparatus at a position higher than the first planar section. The inclined section extends to be inclined from the first planar section to the second planar section.

11 Claims, 10 Drawing Sheets

HYDRAULIC EXCAVATOR

CROSS-REFERENCE TO RELATED APPLICATIONS

This application is a U.S. National stage application of International Application No. PCT/JP2013/053719, filed on Feb. 15, 2013.

BACKGROUND

1. Field of the Invention

The present invention relates to a hydraulic excavator.

2. Background Information

An exhaust treatment apparatus is mounted onto a hydraulic excavator. The exhaust treatment apparatus is connected with an engine and treats exhaust from the engine. Accordingly, the exhaust treatment apparatus is accommodated in an engine room along with the engine.

In a hydraulic excavator which is disclosed in Japanese Unexamined Patent Application Publication No. 2005-16321, the engine and a muffler are accommodated in the engine room. In addition, an engine hood is arranged above the engine. Ventilation holes are provided in the engine hood and a cooling wind passes from the engine room, through the ventilation holes in the engine hood, and is discharged to the outside.

SUMMARY

In recent years, an exhaust treatment apparatus which adopts a diesel particulate filter, selective catalytic reduction, and the like are mounted in the hydraulic excavator due to consideration for the environment. It is preferable that the exhaust treatment apparatus be cooled using a cooling wind since the exhaust treatment apparatus reaches high temperatures. However, in the configuration of the engine hood such as the hydraulic excavator in Japanese Unexamined Patent Application Publication No. 2005-16321 described above, it is difficult to efficiently cool the exhaust treatment apparatus in the engine room using the cooling wind.

On the other hand, the engine hood is arranged above the engine. As a result, it is preferable that the exhaust treatment apparatus be arranged above the engine in order for the exhaust treatment apparatus to be cooled by the cooling wind which flows through the ventilation holes in the engine hood. However, since the exhaust treatment apparatus such as the diesel particulate filter and selective catalytic reduction described above are large in size compared to the muffler, it is necessary to arrange the engine hood at a position which is higher than in the past in order for the exhaust treatment apparatus to be arranged above the engine. However, in this case, a problem occurs in that visibility from a cab to the rear is reduced.

An object of the present invention is to provide a hydraulic excavator where it is possible to improve efficiency of cooling of an exhaust treatment apparatus and suppress reduction in visibility from a cab.

A hydraulic excavator according to a first aspect is provided with an engine, an engine room, a fan, an exhaust treatment apparatus, and an engine hood. The engine room accommodates the engine. The fan generates cooling wind in the engine room. At least a portion of the exhaust treatment apparatus is positioned above the engine. The exhaust treatment apparatus treats exhaust from the engine. The engine hood is arranged above the engine room. The upper surface of the engine hood has a first planar section, a second planar section, and an inclined section. The first planar section is arranged above the engine. The second planar section is arranged above the exhaust treatment apparatus at a position which is higher than the first planar section. The second planar section has ventilation holes. The inclined section is arranged between the first planar section and the second planar section. The inclined section extends to be inclined from the first planar section to the second planar section.

A hydraulic excavator according to a second aspect is the hydraulic excavator according to the first aspect wherein a ventilation hole is not provided in the inclined section.

A hydraulic excavator according to a third aspect is the hydraulic excavator according to the second aspect wherein the exhaust treatment apparatus has an electronic device. The electronic device is arranged so as to overlap with the inclined section in a planar view.

A hydraulic excavator according to a fourth aspect is the hydraulic excavator according to any of the first to the third aspects wherein the engine hood has a first hood component and a second hood component. The first hood component includes the first planar section. The second hood component includes the inclined section and the second planar section. The second hood component is separate to the first hood component.

A hydraulic excavator according to a fifth aspect is the hydraulic excavator according to the fourth aspect wherein the first hood component further has a lower side surface section. The lower side surface section has a shape which is bent when viewed from a predetermined first direction on a horizontal plane. The second hood component further has an upper side surface section. The upper side surface section is arranged above the lower side surface section. The upper side surface section has a shape which is continuous with the shape of the lower side surface section when viewed from the first direction. The upper side surface section has a concave section. The concave section is positioned between both edge sections of the upper side surface section in the first direction. The bottom surface of the concave section has a fixing section for fixing the second hood component to the first hood component.

A hydraulic excavator according to a sixth aspect is the hydraulic excavator according to the fifth aspect wherein the concave section has a first concave section and a second concave section. The first concave section and the second concave section are arranged to be separated from each other in the first direction. The upper side surface section further has a rib section. The rib section is arranged between the first concave section and the second concave section in the first direction.

A hydraulic excavator according to a seventh aspect is the hydraulic excavator according to the fifth or sixth aspect wherein a ventilation hole is provided in the upper side surface section.

A hydraulic excavator according to an eighth aspect is the hydraulic excavator according to any of the fourth to the seventh aspects wherein the upper surface of the engine room has an opening. The second hood component is mounted above the first hood component. The first hood component is attached so that the opening in the engine room is opened and closed.

A hydraulic excavator according to a ninth aspect is the hydraulic excavator according to any of the first to the eighth aspects wherein at least a portion of the exhaust treatment apparatus is positioned above the first planar section.

A hydraulic excavator according to a tenth aspect is the hydraulic excavator according to any of the first to the ninth aspects wherein the exhaust treatment apparatus has a first treatment apparatus, a second treatment apparatus, and a connecting pipe. The first treatment apparatus is arranged to be separated from the engine in a predetermined second direction on a horizontal plane. The second treatment apparatus is arranged between the engine and the first treatment apparatus in the second direction. The connecting pipe connects the first treatment apparatus and the second treatment apparatus.

A hydraulic excavator according to an eleventh aspect is the hydraulic excavator according to the tenth aspect wherein at least a portion of the connection pipe is positioned above the first treatment apparatus or the second treatment apparatus. At least a portion of the connecting pipe is positioned above the first planar section.

In the hydraulic excavator according to the first aspect, cooling wind passes between the engine and the first planar section and is directed to a space between the second planar section and the exhaust treatment apparatus by the inclined section. Since the ventilation holes are provided in the second planar section, the cooling wind which is directed by the inclined section is discharged to the outside from the ventilation holes. Due to this, it is possible to improve the flow of air in the surroundings of the exhaust treatment apparatus. Due to this, it is possible to improve efficiency of cooling of the exhaust treatment apparatus.

In addition, the second planar section is arranged at a position which is higher than the first planar section. That is, the first planar section is arranged at a position which is lower than the second planar section. As a result, it is possible to suppress a reduction in visibility from a cab compared to a case where the entirety of the upper surface of the engine hood is arranged at the same height as the second planar section.

In the hydraulic excavator according to the second aspect, ventilation holes are not provided in the inclined section. As a result, cooling wind with a greater amount of wind is directed to the space between the second planar section and the exhaust treatment apparatus by the inclined section. Due to this, it is possible to further improve efficiency of cooling of the exhaust treatment apparatus.

In the hydraulic excavator according to the third aspect, the electronic device is arranged so as to overlap with the inclined section in a planar view. Accordingly, ventilation holes are not arranged above the electronic device. As a result, it is possible to suppress water damage of the electronic device even if water enters into the engine room from the ventilation holes due to rain or the like. Due to this, it is possible to improve the waterproofing of the electronic device.

In the hydraulic excavator according to the fourth aspect, the engine hood is configured by being split into the first hood component and the second hood component. As a result, forming of the engine hood is easy compared to a case where the first hood component and the second hood component are integrally formed. In addition, the first hood component includes the first planar section and the second hood component includes the second planar section. It is not easy to integrally form a shape with a difference in elevation due to the first planar section and the second planar section, but it is possible to easily form the engine hood by the first hood component and the second hood component being separate components.

In the hydraulic excavator according to the fifth aspect, the first hood component and the second hood component are fixed by the fixing section. Since the fixing section is provided in the concave section, the fixing section is not able to be seen when viewed from the first direction. As a result, it is possible for the side surface of the engine hood which is formed from the upper side surface section and the lower side surface section to be seen as a smooth curved surface.

In the hydraulic excavator according to the sixth aspect, the rib section is provided between the first concave section and the second concave section in the upper side surface section. As a result, it is possible to improve the strength of the upper side surface section using the rib section.

In the hydraulic excavator according to the seventh aspect, since the ventilation holes are provided in the upper side surface section, the cooling wind is also discharged to the outside from the ventilation holes in the upper side surface section. Due to this, it is possible to further improve efficiency of cooling of the exhaust treatment apparatus.

In the hydraulic excavator according to the eighth aspect, the second hood component is mounted above the first hood component. In addition, the first hood component is attached so that the opening in the engine room is opened and closed. As a result, it is possible to open and close the opening in the engine room in an integral manner including the second hood component by an operation of opening and closing using the first hood component.

In the hydraulic excavator according to the ninth aspect, at least a portion of the exhaust treatment apparatus is positioned above the first planar section. That is, the first planar section is arranged at a position which is lower than at least a portion of the exhaust treatment apparatus. As a result, it is possible to further improve visibility from the cab compared to a case where the entirety of the upper surface of the engine hood is arranged at a position which is higher than the exhaust treatment apparatus in order to accommodate the exhaust treatment apparatus.

In the hydraulic excavator according to the tenth aspect, the second treatment apparatus is positioned closer to the engine than the first treatment apparatus. As a result, it is possible to efficiently cool the second treatment apparatus using the cooling wind from a space between the engine and the first planar section.

In the hydraulic excavator according to the eleventh aspect, the top section of the connecting pipe is positioned above the first treatment apparatus or the second treatment apparatus and is positioned above the first planar section. That is, the first planar section is arranged at a position which is lower than the top section of the connecting pipe. As a result, it is possible to further improve visibility from the cab compared to a case where the entirety of the upper surface of the engine hood is arranged above the top section of the connecting pipe in order to accommodate the exhaust treatment apparatus.

DETAILED DESCRIPTION OF THE EMBODIMENT(S)

Figure 1:
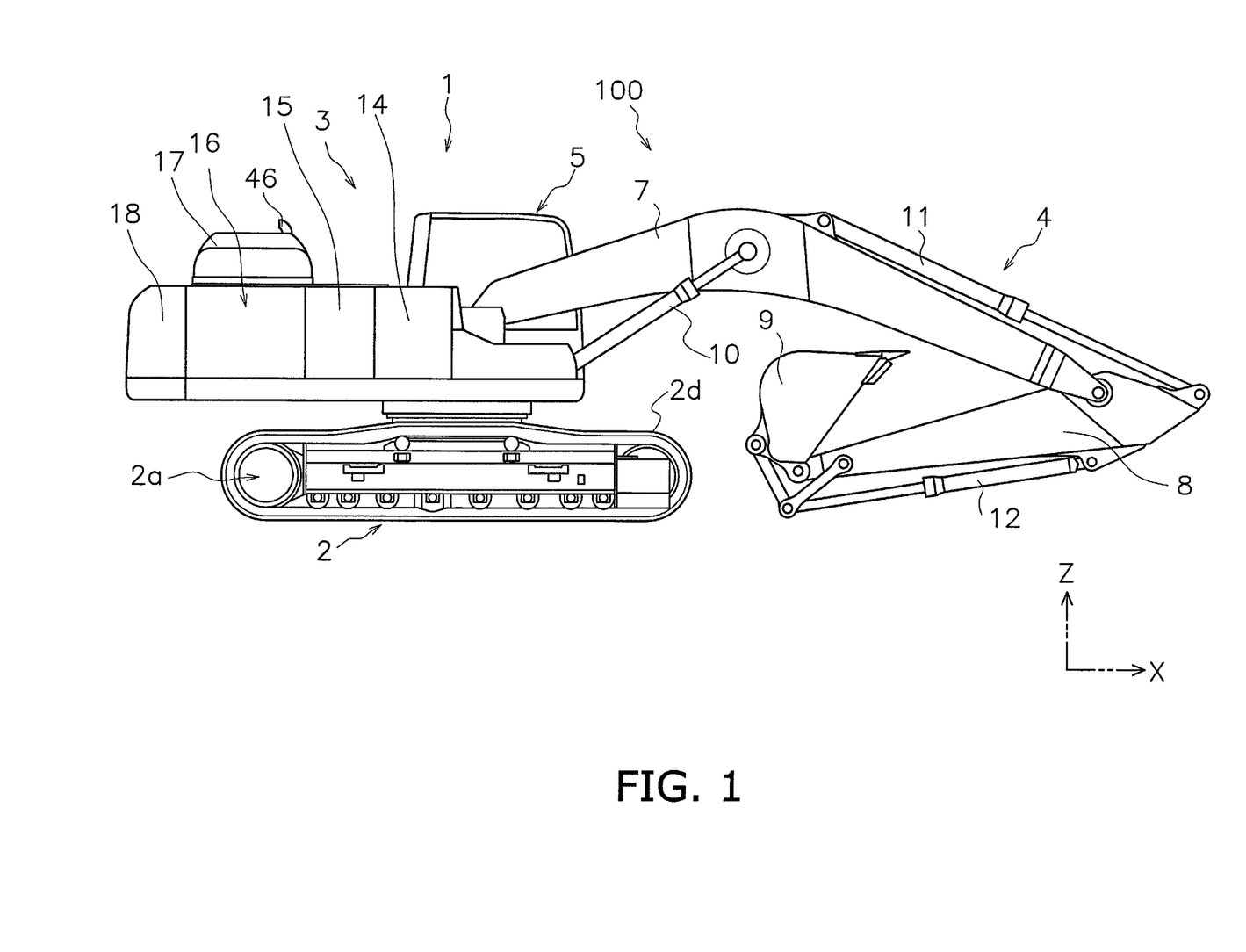
FIG. 1 is a side surface diagram of a hydraulic excavator according to an embodiment.

A hydraulic excavator 100 according to an embodiment of the present invention is shown in FIG. 1. The hydraulic excavator 100 is provided with a vehicle body 1 and a work implement 4.

The vehicle body 1 has a moving body 2 and a revolving body 3. The moving body 2 has a pair of moving apparatuses 2a. Here, only the front side of the pair of moving apparatuses 2a is shown in the diagram in FIG. 1. The moving apparatuses 2a have tracks 2d. The moving apparatuses 2a move the hydraulic excavator 100 by driving the tracks 2d using driving force from an engine 21 (refer to FIG. 2) which will be described later.

Here, in the following description, the front and back direction has the meaning of the front and back direction of the vehicle body 1. In other words, the front and back direction is a direction of the front and back as seen by an operator who is seated in a cab 5. In addition, the left and right direction or the lateral direction has the meaning of the vehicle width direction of the vehicle body 1. In other words, the left and right direction, the vehicle width direction, or the lateral direction is a direction of the left and right as seen by the operator described above. In addition, the front and back direction is shown as the X axis, the left and right direction is shown as the Y axis, and the up and down direction is shown as the Z axis in the diagrams.

The revolving body 3 is mounted onto the moving body 2. The revolving body 3 is provided to be able to revolve with regard to the moving body 2. In addition, the cab 5 is provided on the revolving body 3. The revolving body 3 has a fuel tank 14, a hydraulic oil tank 15, an engine room 16, and a counterweight 18. The fuel tank 14 retains fuel for driving the engine 21 which will be described later. The fuel tank 14 is arranged in front of the hydraulic oil tank 15. The hydraulic oil tank 15 retains hydraulic oil which is discharged from a hydraulic pump 23 (refer to FIG. 2) which will be described later. The hydraulic oil tank 15 is arranged to line up with the fuel tank 14 in the front and back direction.

The engine room 16 accommodates devices such as the engine 21 and the hydraulic pump 23 which will be described later. The engine room 16 is arranged behind the cab 5, the fuel tank 14, and the hydraulic oil tank 15. An engine hood 17 is arranged above the engine room 16. The counterweight 18 is arranged behind the engine room 16.

The work implement 4 is attached to a front section of the revolving body 3. The work implement 4 has a boom 7, an arm 8, a bucket 9, a boom cylinder 10, an arm cylinder 11, and a bucket cylinder 12. The base end portion of the boom 7 is joined to the revolving body 3 so as to be able to rotate. In addition, the base end portion of the arm 8 is joined to the front end portion of the boom 7 so as to be able to rotate. The front end portion of the arm 8 is joined to the bucket 9 so as to be able to rotate. The boom cylinder 10, the arm cylinder 11, and the bucket cylinder 12 are hydraulic cylinders and are driven using the hydraulic oil which is discharged from the hydraulic pump 23 which will be described later. The boom cylinder 10 operates the boom 7. The arm cylinder 11 operates the arm 8. The bucket cylinder 12 operates the bucket 9. The work implement 4 is driven by driving of the cylinders 10, 11 and 12.

Figure 2:
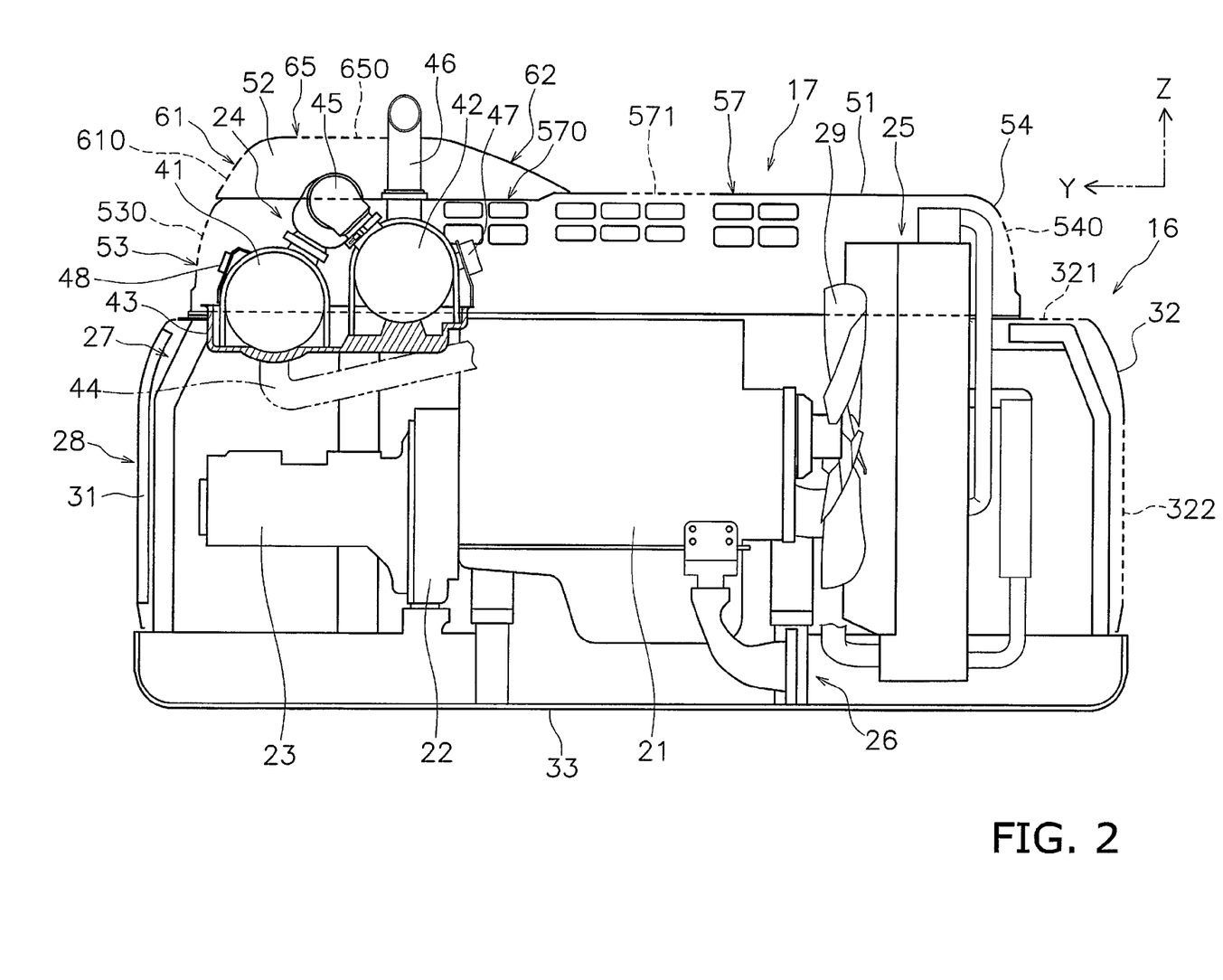
FIG. 2 is a diagram of an inner configuration of an engine room of a hydraulic excavator viewed from the rear of the vehicle.

FIG. 2 is a diagram where the inner configuration of the engine room 16 is viewed from behind the vehicle. As shown in FIG. 2, the engine 21, a flywheel housing 22, the hydraulic pump 23, and an exhaust treatment apparatus 24 are arranged in the engine room 16. In addition, a cooling apparatus 25 which includes a radiator and an oil cooler is arranged in the engine room 16. The cooling apparatus 25 has a fan 29. The fan 29 generates a cooling wind inside the engine room 16. The cooling apparatus 25, the engine 21, the flywheel housing 22, and the hydraulic pump 23 are arranged to line up in the vehicle width direction.

Figure 3:
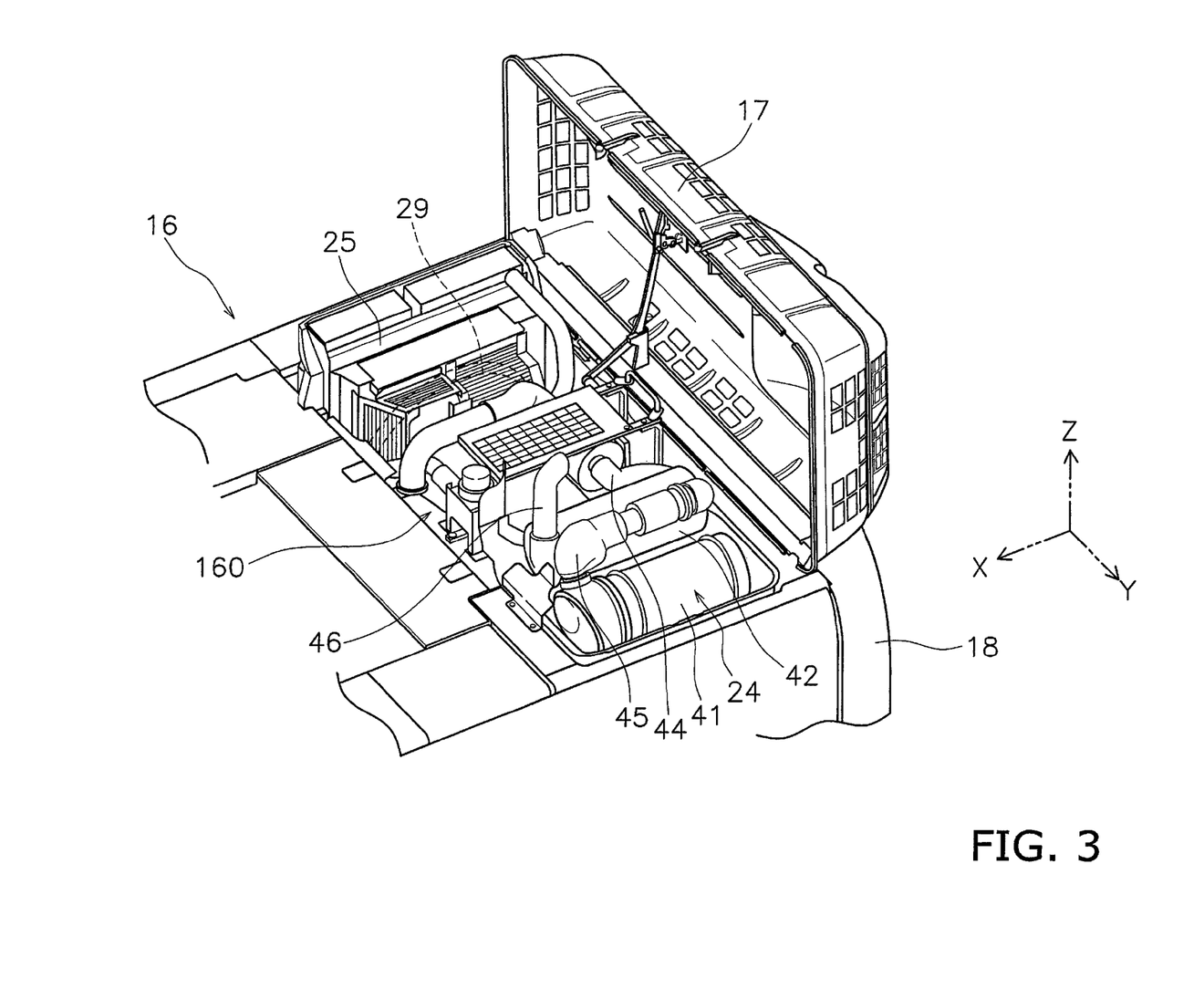
FIG. 3 is a perspective diagram illustrating a rear section of a hydraulic excavator in a state where an opening in an engine room is open.

As shown in FIG. 3, the upper surface of the engine room 16 has an opening 160. The engine hood 17 is provided to be able to open and close the opening 160 in the engine room 16. Here, FIG. 3 is a perspective diagram illustrating a rear section of the hydraulic excavator 100 in a state where the opening 160 in the engine room 16 is open. The configuration of the engine hood 17 will be described in detail later.

As shown in FIG. 2, the hydraulic excavator 100 has a revolving frame 26 and a vehicle body frame 27. The revolving frame 26 supports the engine 21 via a supporting member such as a rubber damper. The vehicle body frame 27 is erected on the revolving frame 26. The vehicle body frame 27 is arranged in the surroundings of the devices such as the engine 21 and the hydraulic pump 23. The engine hood 17 is attached to the vehicle body frame 27.

The hydraulic excavator 100 has an outer cover 28. The outer cover 28 is attached to the vehicle body frame 27. The outer cover 28 has a first side cover 31 and a second side cover 32. In the present embodiment, the first side cover 31 is a left side surface of the engine room 16 and the second side cover 32 is a right side surface of the engine room 16. Ventilation holes 321 are provided in the upper surface of the second side cover 32. Ventilation holes 322 are provided in a side surface of the second side cover 32. Ventilation holes are not provided in the first side cover 31. The hydraulic excavator 100 has an under cover 33. The under cover 33 is arranged below the revolving frame 26 and the vehicle body frame 27. Ventilation holes are not provided in the under cover 33.

The hydraulic pump 23 is driven by the engine 21. The hydraulic pump 23 is arranged at the side of the engine 21. That is, the hydraulic pump 23 is arranged to line up with the engine 21 in the vehicle width direction. The hydraulic pump 23 is arranged at a position which is lower than the upper surface of the engine 21.

The flywheel housing 22 is arranged between the engine 21 and the hydraulic pump 23. The flywheel housing 22 is attached to a side surface of the engine 21. In addition, the hydraulic pump 23 is attached to the side surface of the flywheel housing 22.

The exhaust treatment apparatus 24 treats the exhaust from the engine 21. The exhaust treatment apparatus 24 has a first treatment apparatus 41, a second treatment apparatus 42, and a bracket 43. The exhaust treatment apparatus 24 is arranged above the hydraulic pump 23. At least a portion of the exhaust treatment apparatus 24 is positioned above the engine 21.

The first treatment apparatus 41 is an apparatus which treats exhaust from the engine 21. In the present embodiment, the first treatment apparatus 41 is a diesel particulate filter apparatus which captures the particulate matter which is included in the exhaust using a filter. The first treatment apparatus 41 incinerates the captured particulate matter using a heater which is installed in the filter. The first treatment apparatus 41 has a substantially cylindrical outer shape. The first treatment apparatus 41 is arranged such that the longitudinal direction of the first treatment apparatus 41 is along a predetermined first direction. That is, the first treatment apparatus 41 is arranged such that the longitudinal direction of the first treatment apparatus 41 is along the vehicle front and back direction. Here, the first direction and the vehicle front and back direction have the same meaning in the present embodiment.

The second treatment apparatus 42 is an apparatus which treats exhaust from the engine 21. In the present embodiment, the second treatment apparatus 42 is a selective catalytic reduction apparatus which reduces nitrogen oxide NOx using ammonia which is obtained by hydrolyzation of aqueous urea. The second treatment apparatus 42 has a substantially cylindrical outer shape. The second treatment apparatus 42 is arranged such that the longitudinal direction of the second treatment apparatus 42 is along the vehicle front and back direction.

The first treatment apparatus 41 is arranged to be separated from the engine 21 in a predetermined second direction on a horizontal plane. The second treatment apparatus 42 is arranged between the engine 21 and the first treatment apparatus 41 in the second direction. That is, the second treatment apparatus 42 is arranged between the engine 21 and the first treatment apparatus 41 in the vehicle width direction. The second direction and the vehicle width direction have the same meaning in the present embodiment. The first treatment apparatus 41 and the second treatment apparatus 42 are arranged to be close to each other and are arranged to line up in a state where the respective longitudinal directions of the first treatment apparatus 41 and the second treatment apparatus 42 are perpendicular to the vehicle width direction. The engine 21, the second treatment apparatus 42, and the first treatment apparatus 41 are arranged to line up in this order in the vehicle width direction.

The top section of the first treatment apparatus 41 is arranged above the upper surface of the engine 21. The top section of the second treatment apparatus 42 is arranged above the top section of the first treatment apparatus 41. The top section of the second treatment apparatus 42 is arranged above the upper surface of the engine 21. The bottom section of the first treatment apparatus 41 is arranged below the bottom section of the second treatment apparatus 42. The bottom section of the first treatment apparatus 41 is arranged below the upper surface of the engine 21. The bottom section of the second treatment apparatus 42 is arranged below the top section of the first treatment apparatus 41.

The hydraulic excavator 100 is provided with a first connecting pipe 44. The first connecting pipe 44 joins the engine 21 and the first treatment apparatus 41. In detail, the first connecting pipe 44 is connected with the bottom section of the first treatment apparatus 41.

The exhaust treatment apparatus 24 has a second connecting pipe 45. The second connecting pipe 45 connects the first treatment apparatus 41 and the second treatment apparatus 42. The second connecting pipe 45 is positioned above the space between the first treatment apparatus 41 and the second treatment apparatus 42. The top section of second the connecting pipe 45 is positioned above the first treatment apparatus 41. The top section of the second connecting pipe 45 is positioned above the second treatment apparatus 42.

The hydraulic excavator 100 is provided with a third connecting pipe 46. The third connecting pipe 46 is connected with the second treatment apparatus 42. In detail, the third connecting pipe 46 is connected with the top section of the second treatment apparatus 42. The upper section of the third connecting pipe 46 protrudes upward from the engine hood 17.

The engine 21, the first connecting pipe 44, the first treatment apparatus 41, the second connecting pipe 45, the second treatment apparatus 42, and the third connecting pipe 46 are connected in series in this order. Accordingly, the exhaust from the engine 21 passes through the first connecting pipe 44 and is fed into the first treatment apparatus 41. In the first treatment apparatus 41, particulate matter is mostly reduced from within the exhaust. Next, the exhaust passes through the second connecting pipe 45 and is fed into the second treatment apparatus 42. In the second treatment apparatus 42, NOx is mostly reduced. After this, the cleaned exhaust passes through the third connecting pipe 46, which is an exhaust pipe, and is discharged to the outside.

The second treatment apparatus 42 and the first treatment apparatus 41 are mounted onto the bracket 43. The second treatment apparatus 42, the first treatment apparatus 41, and the bracket 43 are integrated in a state where the second treatment apparatus 42 and the first treatment apparatus 41 are mounted onto the bracket 43. The bracket 43 is fixed to the vehicle body frame 27. Due to this, the exhaust treatment apparatus 24 is fixed to the vehicle body frame 27. The bracket 43 is attached to the vehicle body frame 27 by a fixing means such as a bolt so as to be able to be attached and detached. Accordingly, it is possible to detach the exhaust treatment apparatus 24 from the vehicle by detaching the bracket 43 from the vehicle body frame 27.

Figure 4:
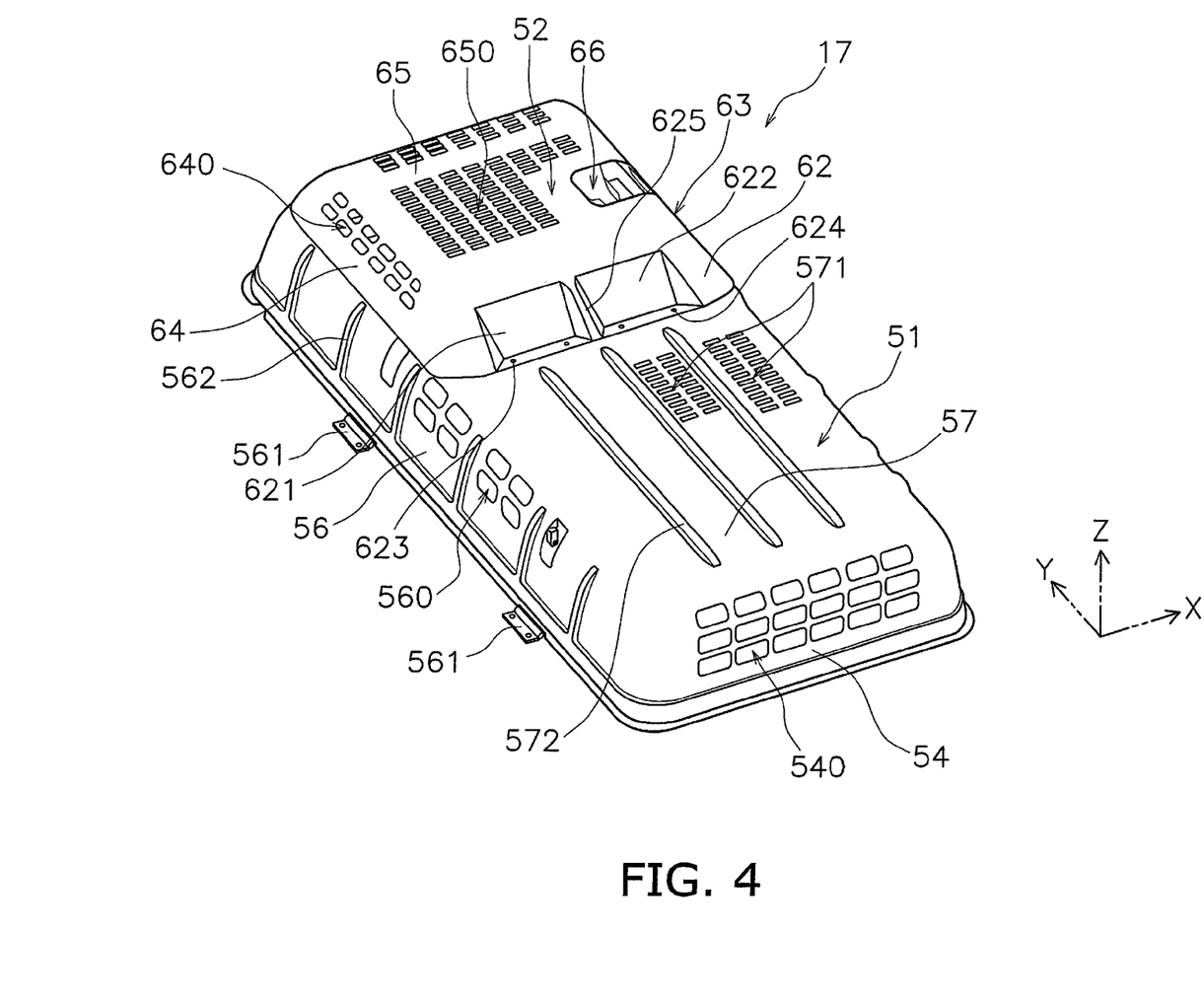
FIG. 4 is a perspective diagram of an engine hood.
Figure 5:
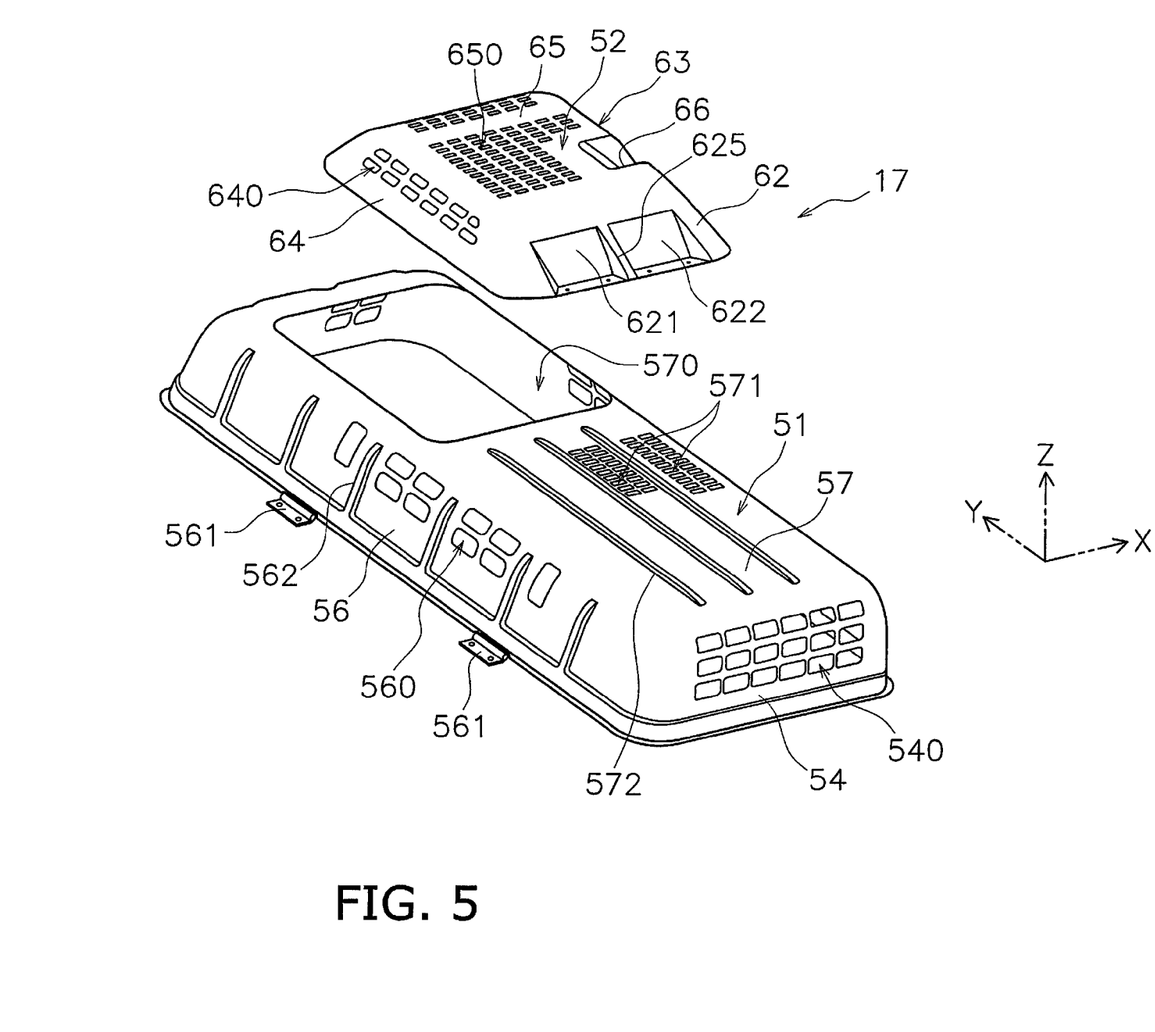
FIG. 5 is an exploded perspective diagram of an engine hood.
Figure 6:
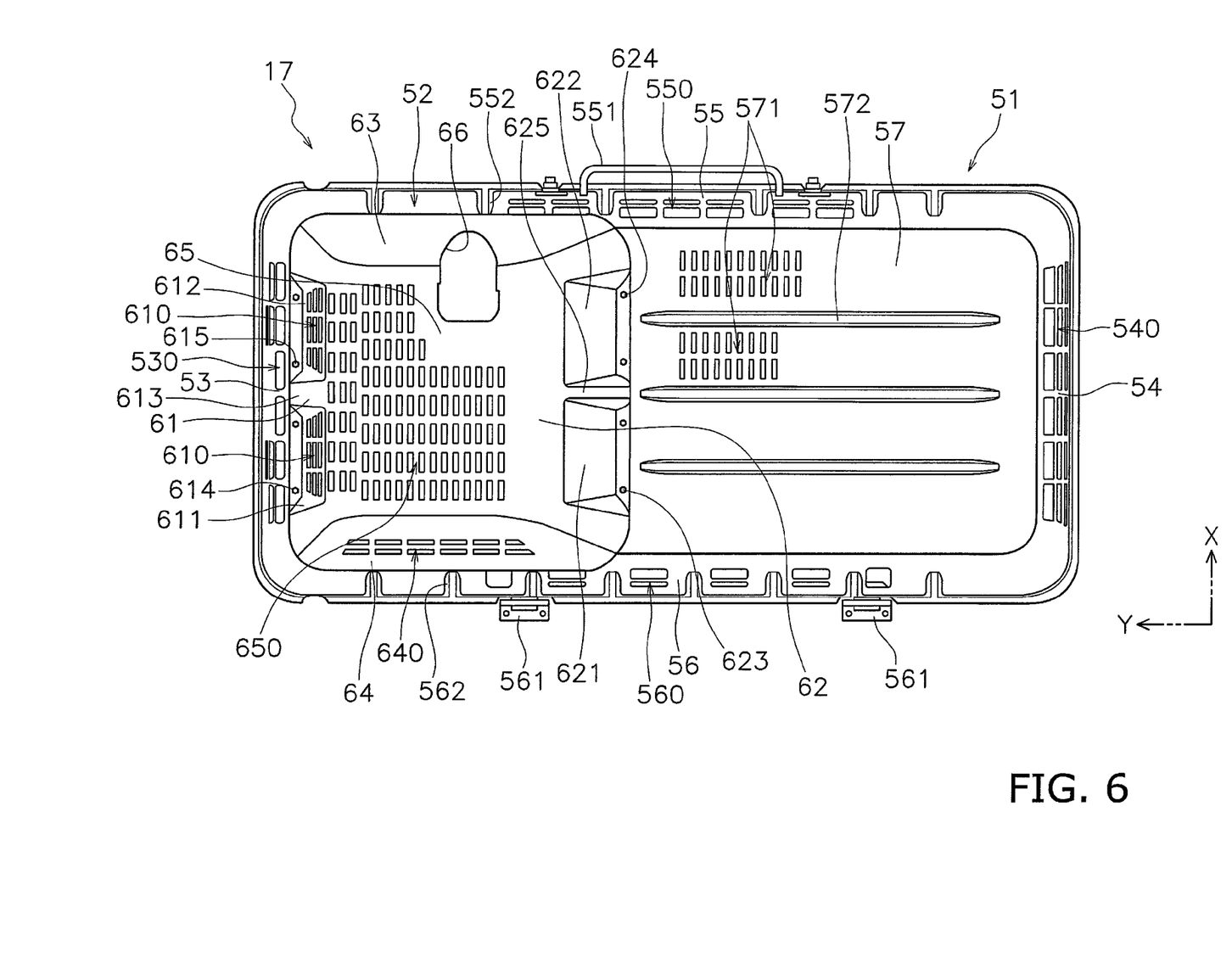
FIG. 6 is a planar diagram of an engine hood.
Figure 7:
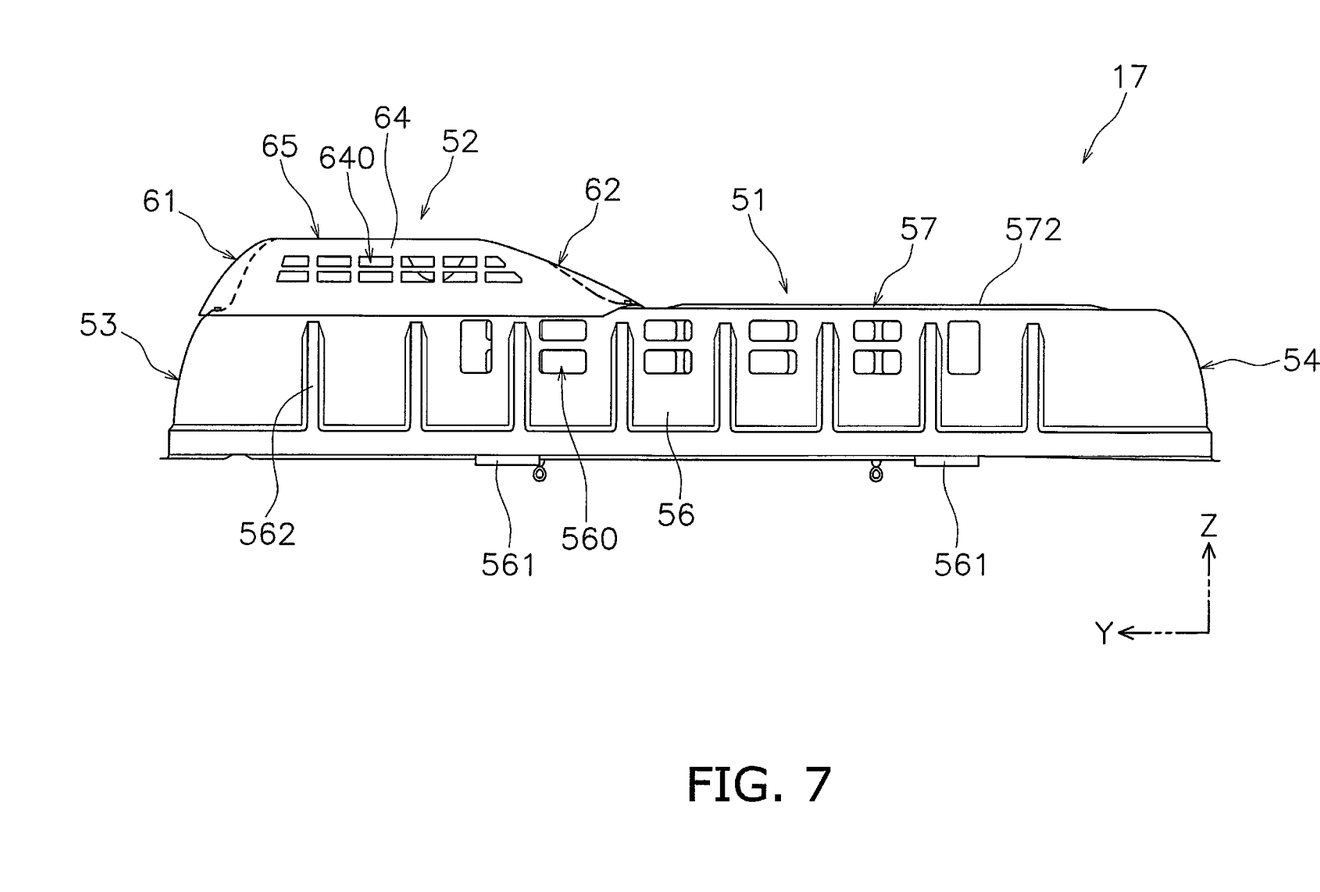
FIG. 7 is a rear surface diagram of an engine hood.
Figure 8:
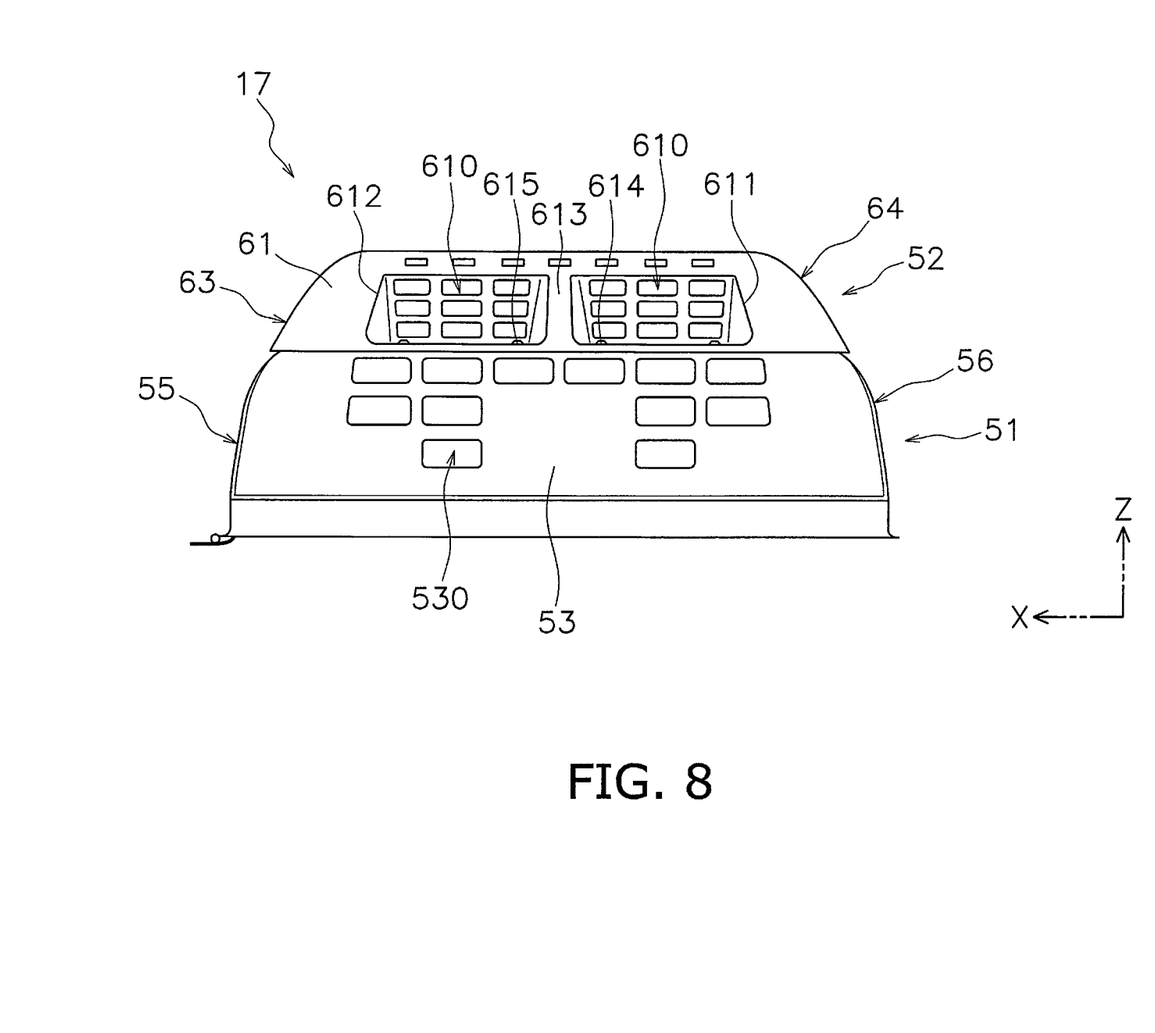
FIG. 8 is a left side surface diagram of an engine hood.

Next, the configuration of the engine hood 17 will be described. FIG. 4 is a perspective diagram of the engine hood 17. FIG. 5 is an exploded perspective diagram of the engine hood 17. FIG. 6 is a planar diagram of the engine hood 17. FIG. 7 is a rear surface diagram of the engine hood 17. FIG. 8 is a left side surface diagram of the engine hood 17. As shown in FIG. 5, the engine hood 17 has a first hood component 51 and a second hood component 52. The second hood component 52 is separate from the first hood component 51. As shown in FIG. 4, the second hood component 52 is mounted above the first hood component 51.

As shown in FIG. 6, the first hood component 51 has a first lower side surface section 53, a second lower side surface section 54, a lower front surface section 55, a lower rear surface section 56, and a first planar section 57. In the present embodiment, the first lower side surface section 53 is the left side surface of the first hood component 51. The second lower side surface section 54 is the right side surface of the first hood component 51.

As shown in FIG. 6 and FIG. 8, ventilation holes 530 are provided in the first lower side surface section 53. As will be described later, the ventilation holes 530 in the first lower side surface section 53 function as exhaust openings through which passes air which is discharged from the inside of the engine room 16 to the outside. As shown in FIG. 4 and FIG. 6, ventilation holes 540 are provided in the second lower side surface section 54. As will be described later, the ventilation holes 540 in the second lower side surface section 54 function as suction openings through which passes air which is sucked into the engine room 16 from the outside.

As shown in FIG. 6, ventilation holes 550 are provided in the lower front surface section 55. As will be described later, the ventilation holes 550 in the lower front surface section 55 function as exhaust openings through which passes air which is discharged from the inside of the engine room 16 to the outside. A gripping section 551 is attached to the lower front surface section 55. It is possible for an operator to easily perform opening and closing of the engine hood 17 by grasping the gripping section 551. A plurality of ribs 552 are provided in the lower front surface section 55. The plurality of ribs 552 in the lower front surface section 55 are arranged with intervals from each other in the vehicle width direction. The plurality of ribs 552 in the lower front surface section 55 are provided so as to each extend in the up and down direction. Here, only some of the plurality of ribs in the lower front surface section 55 are given the reference numeral 552 in the diagram.

As shown in FIG. 6 and FIG. 7, ventilation holes 560 are provided in the lower rear surface section 56. As will be described later, the ventilation holes 560 in the lower rear surface section 56 function as exhaust openings through which passes air which is discharged from the inside of the engine room 16 to the outside. A hinge section 561 is provided in the lower rear surface section 56. The first hood component 51 is attached so as to be able to rotate with regard to the engine room 16 through the hinge section 561. Due to this, the first hood component 51 is attached so as to open and close the opening 160 in the engine room 16. A plurality of ribs 562 are provided in the lower rear surface section 56. The plurality of ribs 552 in the lower rear surface section 56 are arranged with intervals from each other in the vehicle width direction. The plurality of ribs 562 in the lower rear surface section 56 are provided so as to each extend in the up and down direction. Here, only some of the plurality of ribs in the lower rear surface section 56 are given the reference numeral 562 in the diagram.

The first planar section 57 is the upper surface of the first hood component 51. As shown in FIG. 5, an opening 570 is provided in the first hood component 51. The opening 570 is positioned to the left of the first planar section 57. As shown in FIG. 6, ventilation holes 571 are provided in the first planar section 57. The ventilation holes 571 in the first planar section 57 function as exhaust openings through which passes air which is discharged from the inside of the engine room 16 to the outside. A plurality of ribs 572 are provided in the first planar section 57. The plurality of ribs 572 in the first planar section 57 are arranged with intervals from each other in the front and back direction. The plurality of ribs 572 in the first planar section 57 are provided so as to each extend in the vehicle width direction. Here, only some of the plurality of ribs in the first planar section 57 are given the reference numeral 572 in the diagram.

As shown in FIG. 6, the second hood component 52 has a first upper side surface section 61, an inclined section 62, an upper front surface section 63, an upper rear surface section 64, and a second planar section 65. In the present embodiment, the first upper side surface section 61 is the left side surface of the second hood component 52. The inclined section 62 is the right side surface of the second hood component 52.

As shown in FIG. 6 and FIG. 8, ventilation holes 610 are provided in the first upper side surface section 61. As will be described later, the ventilation holes 610 in the first upper side surface section 61 function as exhaust openings through which passes air which is discharged from the inside of the engine room 16 to the outside. As shown in FIG. 7, the first upper side surface section 61 has a curved shape when viewed from the vehicle front and back direction. The first upper side surface section 61 is positioned above the first lower side surface section 53. The first lower side surface section 53 has a curved surface when viewed from the vehicle front and back direction. The first upper side surface section 61 has a shape which is continuous with the shape of the first lower side surface section 53 when viewed from the vehicle front and back direction. That is, the first upper side surface section 61 has a shape which is continuous with the shape of the first lower side surface section 53 in a vehicle rear surface view. Here, the second lower side surface section 54 also has a curved surface when viewed from the vehicle front and back direction in the same manner as the first lower side surface section 53.

As shown in FIG. 6 and FIG. 8, the first upper side surface section 61 has a first concave section 611 and a second concave section 612. The first concave section 611 and the second concave section 612 are positioned between both edge sections of the first upper side surface section 61 in the vehicle front and back direction. The bottom surface of the first concave section 611 has a fixing section 614 for fixing the second hood component 52 to the first hood component 51. The bottom surface of the second concave section 612 has a fixing section 615 for fixing the second hood component 52 to the first hood component 51. For example, the fixing sections 614 and 615 are bolts. Here, the ventilation holes 610 in the first upper side surface section 61 described above are provided in each of the first concave section 611 and the second concave section 612.

The first concave section 611 and the second concave section 612 are arranged to be separated from each other in the vehicle front and back direction. The first upper side surface section 61 further has a rib section 613. The rib section 613 is arranged between the first concave section 611 and the second concave section 612 in the vehicle front and back direction. The rib section 613 is provided so as to extend in the up and down direction.

As shown in FIG. 6, ventilation holes are not provided in the upper front surface section 63. In addition, ribs are not provided in the upper front surface section 63. As shown in FIG. 6 and FIG. 7, ventilation holes 640 are provided in the upper rear surface section 64. As will be described later, the ventilation holes 640 in the upper rear surface section 64 function as exhaust openings through which passes air which is discharged from the inside of the engine room 16 to the outside. Ribs are not provided in the upper rear surface section 64.

The second planar section 65 is the upper surface of the second hood component 52. The second planar section 65 is arranged at a position which is higher than the first planar section 57. The second planar section 65 has ventilation holes 650. As will be described later, the ventilation holes 650 in the second planar section 65 function as exhaust openings through which passes air which is discharged from the inside of the engine room 16 to the outside.

Here, as shown in FIG. 4 and FIG. 6, an opening 66 through which the third connecting pipe 46 described above is passed is provided in the second hood component 52. The opening 66 is provided so as to span between the second planar section 65 and the upper front surface section 63.

As shown in FIG. 4 and FIG. 7, the inclined section 62 is arranged between the first planar section 57 and the second planar section 65. The inclined section 62 extends to be inclined from the first planar section 57 toward the second planar section 65. The inclination angle of the inclined section 62 with regard to the horizontal direction is smaller than the inclination angle of the first upper side surface section 61 with regard to the horizontal direction. The inclination angle of the inclined section 62 with regard to the horizontal direction is smaller than the inclination angle of the second lower side surface section 54 with regard to the horizontal direction. The inclined section 62 has a continuous shape. That is, ventilation holes are not provided in the inclined section 62.

As shown in FIG. 4, the inclined section 62 has a third concave section 621 and a fourth concave section 622. The third concave section 621 and the fourth concave section 622 are positioned between both edge sections of the inclined section 62 in the vehicle front and back direction. The bottom surface of the third concave section 621 has a fixing section 623 for fixing the second hood component 52 to the first hood component 51. The bottom surface of the fourth concave section 622 has a fixing section 624 for fixing the second hood component 52 to the first hood component 51. For example, the fixing section 623 and the fixing section 624 are bolts.

The third concave section 621 and the fourth concave section 622 are arranged to be separated from each other in the vehicle front and back direction. The inclined section 62 further has a rib section 625. The rib section 625 is arranged between the third concave section 621 and the fourth concave section 622 in the vehicle front and back direction. The rib section 625 is provided so as to extend along the inclination direction of the inclined section 62.

As shown in FIG. 2, the first planar section 57 of the engine hood 17 is arranged above the engine 21. Here, although not shown in the diagrams, an auxiliary device of the engine 21 is arranged between the upper surface of the engine 21 and the first planar section 57. The second planar section 65 is arranged above the exhaust treatment apparatus 24. As described above, the inclined section 62 extends to be inclined from the first planar section 57 toward the second planar section 65.

At least a portion of the exhaust treatment apparatus 24 is positioned above the first planar section 57. In detail, the top section of the second connecting pipe 45 is positioned above the first planar section 57. Accordingly, the top section of the second connecting pipe 45 is positioned above the opening 570 in the upper surface of the first hood component 51.

The exhaust treatment apparatus 24 has a first electronic device 48. The first electronic device 48 includes, for example, devices such as an ECU or a temperature sensor. The first electronic device 48 is attached to a side surface of the first treatment apparatus 41. The first electronic device 48 is arranged below a portion of the first side surface section 61 where the ventilation holes 610 are not provided. In detail, the first electronic device 48 is arranged below the rib section 613 (refer to FIG. 10). As a result, it is possible to suppress water damage of the first electronic device 48 even if water enters into the engine room 16 from the ventilation holes due to rain or the like.

The exhaust treatment apparatus 24 has a second electronic device 47. The second electronic device 47 includes, for example, devices such as an ECU or a temperature sensor. The second electronic device 47 is attached to a side surface of the second treatment apparatus 42. The second electronic device 47 is arranged below the inclined section 62. That is, the second electronic device 47 is arranged so as to overlap with the inclined section 62 in a planar view.

Figure 9:
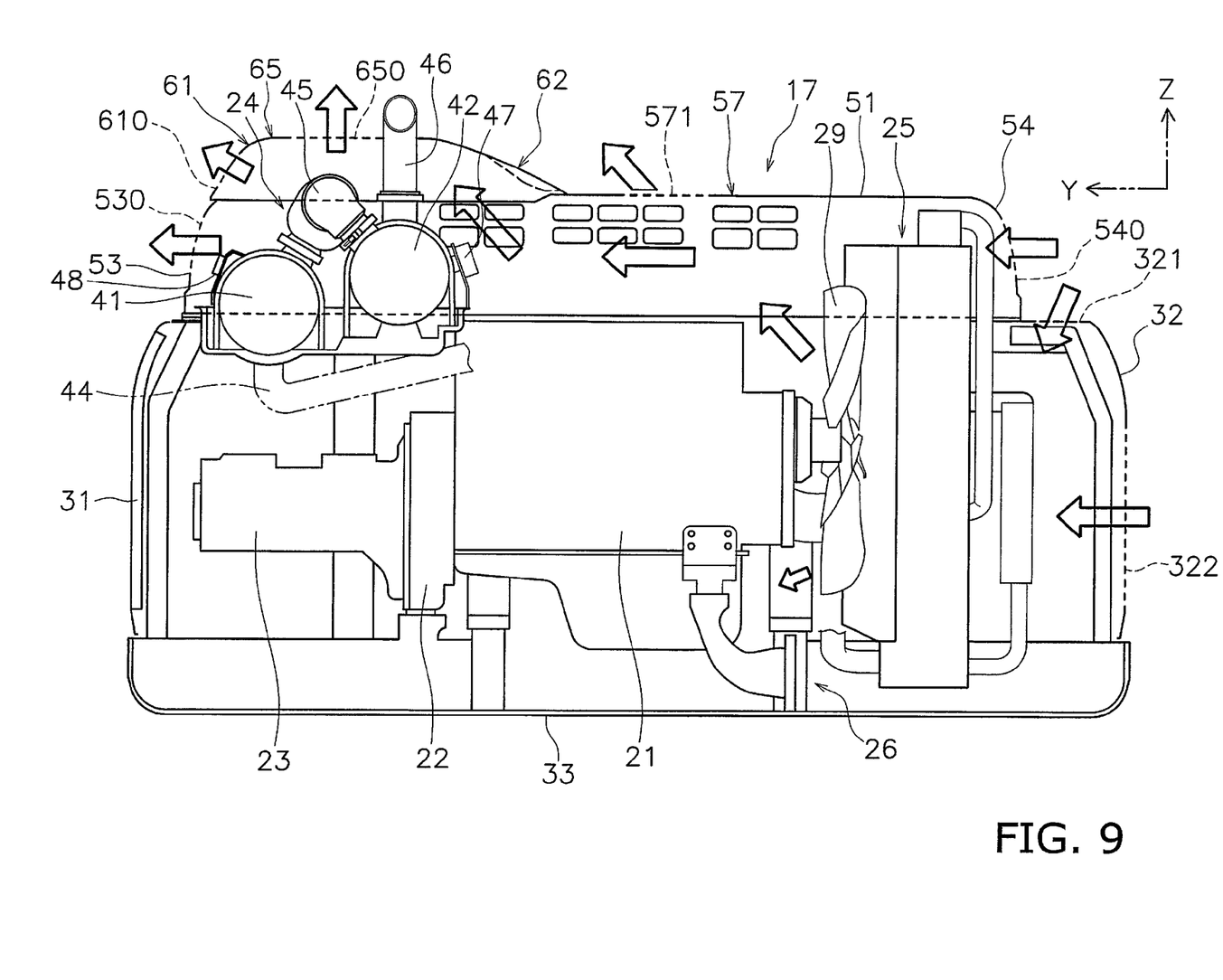
FIG. 9 is a diagram schematically illustrating the flow of air in FIG. 2 using arrows.
Figure 10:
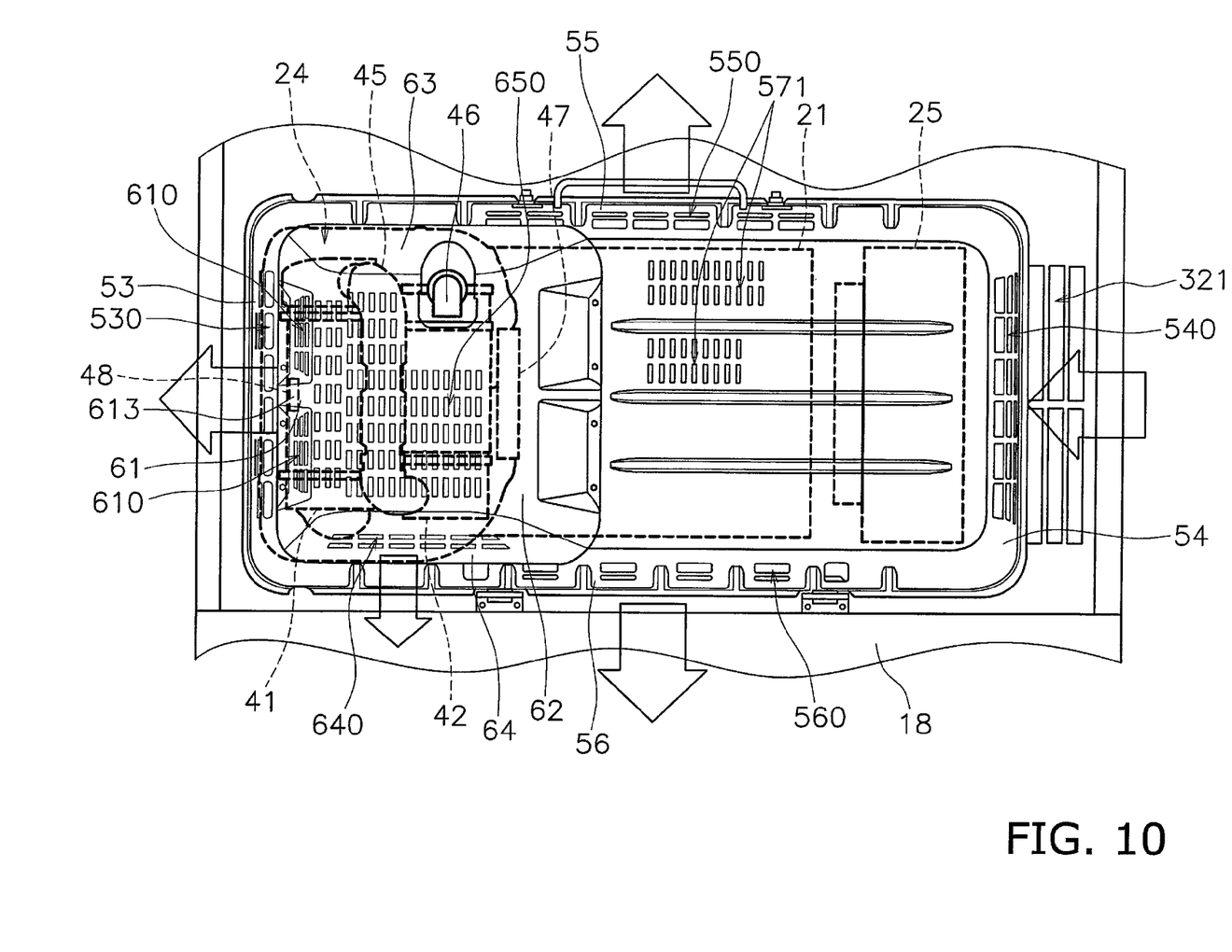
FIG. 10 is a diagram schematically illustrating the flow of a cooling wind using arrows in an upper surface diagram of the rear section of a hydraulic excavator.

Next, the flow of a cooling wind which is generated by the fan 29 in the engine room 16 will be described based on FIG. 9 and FIG. 10. FIG. 9 is a diagram schematically illustrating the flow of a cooling wind in FIG. 2 using arrows. FIG. 10 is a diagram schematically illustrating the flow of a cooling wind using arrows in an upper surface diagram of the rear section of the hydraulic excavator 100.

As shown in FIG. 9, the cooling wind is taken into the engine room 16 from the ventilation holes 321 and 322 in the second side cover 32 and the ventilation holes 540 in the second lower side surface section 54. The cooling wind passes through the cooling apparatus 25. Due to this, the cooling liquid and the hydraulic oil in the engine 21 are cooled. The cooling wind passes between the upper surface of the engine 21 and the first planar section 57. The cooling wind is directed to the space between the second planar section 65 and the exhaust treatment apparatus 24 by the inclined section 62. At this time, the side surface of the second treatment apparatus 42 directs the cooling wind to the ventilation holes 650 in the second planar section 65. Then, the cooling wind is discharged to the outside by passing through the ventilation holes 650 in the second planar section 65, the ventilation holes 610 in the first upper side surface section 61, and the ventilation holes 530 at the first lower side surface section 53. In addition, as shown in FIG. 10, the cooling wind is also discharged to the outside from the ventilation holes 640 in the upper rear surface section 64.

As shown in FIG. 9, a portion of the cooling wind is discharged to the outside from the ventilation holes 571 in the first planar section 57 when passing through the space between the engine 21 and the first planar section 57. In addition, as shown in FIG. 10, a portion of the cooling wind is also discharged to the outside from the ventilation holes 550 in the upper front surface section 55 and the ventilation holes 560 in the lower rear surface section 56.

Here, as described above, ventilation holes are not provided in the first side cover 31 and the under cover 33. As a result, the amount of cooling wind which flows under the engine 21 is small and the bulk of the cooling wind passes above the engine 21.

The following characteristics are provided in the hydraulic excavator 100 according to the present embodiment.

In the hydraulic excavator 100, the cooling wind passes between the engine 21 and the first planar section 57 and is directed to the space between the second planar section 65 and the exhaust treatment apparatus 24 by the inclined section 62. Since the ventilation holes 650 are provided in the second planar section 65, the cooling wind which is directed by the inclined section 62 is discharged to the outside from the ventilation holes 650. Due to this, it is possible to improve the flow of air in the surroundings of the exhaust treatment apparatus 24. Due to this, it is possible to improve efficiency of cooling of the exhaust treatment apparatus 24.

In addition, the second planar section 65 is arranged at a position which is higher than the first planar section 57. That is, the first planar section 57 is arranged at a position which is lower than the second planar section 65. As a result, it is possible to suppress a reduction in visibility from the cab 5 to the rear compared to a case where the entirety of the engine hood 17 is arranged at the same height as the second planar section 65.

Ventilation holes are not provided in the inclined section 62. As a result, the cooling wind with a greater amount of wind is directed to the space between the second planar section 65 and the exhaust treatment apparatus 24 by the inclined section 62. Due to this, it is possible to further improve efficiency of cooling of the exhaust treatment apparatus 24.

The second electronic device 47 is arranged so as to overlap with the inclined section 62 in a planar view and ventilation holes are not arranged above the second electronic device 47. As a result, it is possible to suppress water damage of the second electronic device 47 even if water enters into the engine room 16 from the ventilation holes due to rain or the like. Due to this, it is possible to improve the waterproofing of the second electronic device 47.

The engine hood 17 is configured by being split into the first hood component 51 and the second hood component 52. As a result, forming of the engine hood 17 is easy compared to a case where the first hood component 51 and the second hood component 52 component are integrally formed. In detail, the first hood component 51 includes the first planar section 57 and the second hood component 52 includes the second planar section 65. It is not easy to integrally form a shape with a difference in elevation due to the first planar section 57 and the second planar section 65, but it is possible to easily form the engine hood 17 by the first hood component 51 and the second hood component 52 being separate components.

The first hood component 51 and the second hood component 52 are fixed by the fixing sections 614 and 615. The fixing section 614 is provided in the first concave section 611 and the fixing section 615 is provided in the second concave section 612. Accordingly, the fixing sections 614 and 615 are not able to be seen in a vehicle front and back direction view. As a result, it is possible for the side surface of the engine hood 17 which is formed from the first upper side surface section 61 and the first lower side surface section 53 to be seen as a smooth curved surface.

The rib section 613 is provided between the first concave section 611 and the second concave section 612 in the first upper side surface section 61. As a result, it is possible to improve the strength of the first upper side surface section 61 using the rib section 613.

Since the ventilation holes 610 are provided in the first upper side surface section 61, it is possible for the cooling wind which passes between the second planar section 65 and the exhaust treatment apparatus 24 to be discharged to the outside from the ventilation holes 610 in the first upper side surface section 61.

The second hood component 52 is mounted above the first hood component 51. In addition, the first hood component 51 is attached so that the opening 160 in the engine room 16 is opened and closed. As a result, it is possible to open and close the opening 160 in the engine room 16 in an integral manner including the second hood component 52 by an operation of opening and closing using the first hood component 51.

The second treatment apparatus 42 is positioned closer to the engine 21 than the first treatment apparatus 41. As a result, it is possible to efficiently cool the second treatment apparatus 42 using the cooling wind from the space between the engine 21 and the first planar section 57.

The second treatment apparatus 42 is configured so that the cooling wind which is generated by the fan 29 is directed to the ventilation holes 650 in the second planar section 65 by the side surface of the second treatment apparatus 42. As a result, it is possible to further improve efficiency of cooling using the cooling wind.

The top section of the second connecting pipe 45 is positioned above the first treatment apparatus 41 and the second treatment apparatus 42 and is also positioned above the first planar section 57. That is, the first planar section 57 is arranged at a position which is lower than the top section of the second connecting pipe 45. As a result, it is possible to further improve visibility from the cab 5 compared to a case where the entirety of the upper surface of the engine hood 17 is arranged above the top section of the second connecting pipe 45 in order to accommodate the exhaust treatment apparatus 24.

Above, an embodiment of the present invention is described but the present invention is not limited to the embodiment described above and various modifications are possible in a scope which does not depart from the gist of the invention.

The first direction is not limited to the vehicle front and back direction and may be another direction. The second direction is not limited to the vehicle width direction and may be another direction. For example, the first direction may be the vehicle width direction and the second direction may be the vehicle front and back direction.

The shape of the engine hood is not limited to the shape described above. For example, the engine hood may be a shape where left and right are reversed with regard to the shape described above in a case where the left and right of the arrangement of the cooling apparatus, the engine, and the exhaust treatment apparatus is reversed with regard to the arrangement described above. The arrangement of the ventilation holes are not limited to the positions described above. For example, a portion of the ventilation holes in the first hood component may be omitted. Alternatively, a portion of the ventilation holes in the second hood component may be omitted.

The configuration of the exhaust treatment apparatus is not limited to the configuration described above. For example, the first treatment apparatus may be a treatment apparatus other than a diesel particulate filter apparatus. The second treatment apparatus may be a treatment apparatus other than a selective catalytic reduction apparatus. The first treatment apparatus and the second treatment apparatus may be arranged at positions which are different to the positions described above. The first treatment apparatus is not limited to a cylindrical shape or the like and may be other shapes such as an elliptical shape, a rectangular shape, or the like. The second treatment apparatus is not limited to a cylindrical shape or the like and may be other shapes such as an elliptical shape, a rectangular shape, or the like. The first to third connecting pipes may be arranged at positions which are different to the positions described above. For example, the second connecting pipe may be arranged below the first treatment apparatus and the second treatment apparatus.

The entirety of the exhaust treatment apparatus may be positioned above the upper surface of the engine. The entirety of the exhaust treatment apparatus may be positioned above the first planar section. The top section of the first treatment apparatus may be positioned above the first planar section. The top section of the second treatment apparatus may be positioned above the first planar section.

According to the present invention, it is possible to improve efficiency of cooling of an exhaust treatment apparatus and suppress reduction in visibility from a cab in a hydraulic excavator.

The invention claimed is:

1. A hydraulic excavator comprising:
    an engine;
    an engine room with the engine disposed therein, the engine room having an opening formed at an upper end thereof;
    a fan configured to generate cooling wind in the engine room;
    an exhaust treatment apparatus configured to treat exhaust from the engine, the exhaust treatment apparatus being at least partially positioned above the engine; and
    an engine hood arranged above the engine room, the engine hood being arranged and configured to open and close the opening of the engine room, an upper surface of the engine hood having
        a first planar section arranged above the engine,
        a second planar section including ventilation holes, the second planar section being arranged above the exhaust treatment apparatus at a position higher than the first planar section, and
        an inclined section arranged between the first planar section and the second planar section, the inclined section extending to be inclined from the first planar section to the second planar section.

2. The hydraulic excavator according to claim 1, wherein a ventilation hole is not provided in the inclined section.

3. The hydraulic excavator according to claim 2, wherein the exhaust treatment apparatus has an electronic device, and the electronic device is arranged so as to overlap with the inclined section in a planar view.

4. The hydraulic excavator according to claim 1, wherein the engine hood further has
a first hood component including the first planar section; and
a second hood component including the inclined section and the second planar section, the second hood component being separate to the first hood component.

5. The hydraulic excavator according to claim 4, wherein the first hood component further has a lower side surface section having a bent shape when viewed from a predetermined first direction on a horizontal plane,
the second hood component further has an upper side surface section arranged above the lower side surface section, the upper side surface section having a shape continuous with the bent shape of the lower side surface section when viewed from the first direction,
the upper side surface section has a concave section positioned between a pair of edge sections of the upper side surface section along the first direction, and
a bottom surface of the concave section has a fixing section configured to fix the second hood component to the first hood component.

6. The hydraulic excavator according to claim 5, wherein the concave section has a first concave section and a second concave section arranged to be separated from each other along the first direction, and
the upper side surface section further has a rib section arranged between the first concave section and the second concave section along the first direction.

7. The hydraulic excavator according to claim 5, wherein a ventilation hole is provided in the upper side surface section.

8. The hydraulic excavator according to claim 4, wherein an upper surface of the engine room has an opening,
the second hood component is mounted above the first hood component, and
the first hood component is attached so that the opening in the engine room is opened and closed.

9. The hydraulic excavator according to claim 1, wherein at least a portion of the exhaust treatment apparatus is positioned above the first planar section.

10. The hydraulic excavator according to claim 1, wherein the exhaust treatment apparatus has
a first treatment apparatus arranged to be separated from the engine along a predetermined second direction on a horizontal plane;
a second treatment apparatus arranged between the engine and the first treatment apparatus along the second direction; and
a connecting pipe connecting the first treatment apparatus and the second treatment apparatus.

11. The hydraulic excavator according to claim 10, wherein at least a portion of the connection pipe is positioned above the first treatment apparatus or the second treatment apparatus, and
at least a portion of the connecting pipe is positioned above the first planar section.

* * * * *